United States Patent [19]

Bahr et al.

[11] 4,339,477

[45] Jul. 13, 1982

[54] PROCESS FOR PREPARING A PIGMENTED LACQUER

[75] Inventors: Dietrich J. Bahr, Herrenberg; Marian Briska, Böblingen, both of Fed. Rep. of Germany

[73] Assignee: International Business Machines Corporation, Armonk, N.Y.

[21] Appl. No.: 244,363

[22] Filed: Mar. 16, 1981

[30] Foreign Application Priority Data

Jun. 25, 1980 [DE] Fed. Rep. of Germany ....... 3023700

[51] Int. Cl.³ .......................... B41M 3/00; C09C 1/00

[52] U.S. Cl. .................................... 427/146; 106/241; 106/288 B; 346/135.1; 427/56.1

[58] Field of Search ............................ 106/288 B, 241; 423/430; 346/135.1, 150; 260/37 M; 427/148, 404, 407.1, 146, 56.1

[56] References Cited

U.S. PATENT DOCUMENTS 3,831,179 8/1974 Brill et al. ........................ 346/135.1

*Primary Examiner*—Theodore Morris

*Attorney, Agent, or Firm*—Joseph G. Walsh

[57] ABSTRACT

The lacquer contains a white pigment with a grain size bigger than all other pigments in the lacquer. This white pigment either changes its color itself under the influence of heat, or under the influence of heat with a substance coacting with the pigment. Preferably used is a natural or synthetic hard polymer, or in particular, calcium carbonate with an admixture of approximately 10% sodium glycolate.

5 Claims, No Drawings

PROCESS FOR PREPARING A PIGMENTED LACQUER

DESCRIPTION

TECHNICAL FIELD

The invention relates to a process for preparing a pigmented lacquer for a record carrier covered or coated with an aluminum or aluminum-containing layer.

PRIOR ART

In German patent application P No. 30 07 330.4, it has already been suggested to pigment the lacquer used for record carriers coated with aluminum or with aluminum-containing layers, in such a manner that in printing with an electroerosion printer, the electrodes glide on the tops of the pigments. In this manner, a direct contact between the electrodes heated through printing and the lacquer is substantially avoided. Without the admixture of such a pigment, particularly of calcium carbonate, the heated electrodes would partially pyrolyze the lacquer during printing so that the vapors formed in the process would condense in the dust-like calcination residues, and form after some time a solid cake which considerably disturbs the printing process. According to the above-mentioned German patent application, this caking was prevented by the admixture of $CaCO_3$. The also occurring decomposition products of $CaCO_3$, i.e., CaO and $CaC_2$, also act as drying agents.

These lacquers should generally be dyed dark or black to ensure sufficient contrast in printing. This can be achieved when a black or dark pigment is admixed with the lacquer. When the lacquer also contains a white pigment, e.g., $CaCO_3$, this pigment prevents, in spite of the dyeing of the lacquer with soot, a thoroughly black appearance of the printed parts, although the lacquer not coated with aluminum appears extremely dark. Even if their diameter is greater than the thickness of the lacquer layer, these pigments are substantially coated with the soot-enriched lacquer, but when the electrodes glide over the tops of the pigment grains, they tear the lacquer layer which is very thin there, and sometimes even destroy the tops of the pigment grains so that the white pigment, e.g., $CaCO_3$, is visible. In the above-mentioned patent application, it has also been suggested to dye the $CaCO_3$ by precipitating it together with heavy metals to change it into a dark color. With this step, e.g., through admixing $CaCO_3$, the grey appearance of a lacquer pigmented in that manner could surely be considerably improved, if not eliminated.

However, in a lacquer of such pigmentation the grains are worn in the above-described manner not only in the zone of the burnt-out places, but also where the electrodes wipe over the paper without printing. As the aluminum layer of only 30 to 40 mm thickness does not offer any mechanical protection, microscopically small holes are made in the aluminum layer where the white pigment, e.g., $CaCO_3$, appears. It is under these conditions that the tearing off of the thin dark lacquer layer and of the white pigment tops, which can consist of $CaCO_3$, proves very advantageous for the white holes in the aluminum layer are scarcely visible to the naked eye and are not reproduced by a camera either. In other words, the wiping traces are reduced to a degree that is no longer disturbing.

When these pigment grains, e.g., those consisting of calcium carbonate, are dyed to a dark color, it is highly disadvantageous, particularly in those places, because instead of the white holes in the aluminum layer, easily visible black holes then appear.

It is, therefore, the object of the present invention to effect a selective dyeing of these pigment grains such that those pigments, which in the burnt-out places contact the hot electrodes, change into a dark color, whereas the pigments in the unprinted places over which the electrodes glide in their cold state only maintain their bright or white appearance.

DISCLOSURE OF THE INVENTION

According to the present invention, this is achieved in that a white pigment is used whose grain size is greater than that of all other pigments in the lacquer, so that this pigment protrudes over the lacquer surface, and this pigment changes under the influence of heat into a dark or black color.

Preferably, a substance is used for the white pigment which itself changes under the influence of heat into dark or black color. It is furthermore possible to use for the white pigment a substance with additives which under the influence of heat effect a dark or black dyeing of the pigment. The process specifically consists in that as a white pigment a synthetic or natural granulated hard polymer is used, which, under the influence of heat, changes into dark or black color. In a specific case referring to the production of a calcium carbonate-containing lacquer, the calcium carbonate is precipitated with a substance that forms a white carbonate and changes into a black or dark color under the influence of heat. Therefore, it is in any case either the white pigment itself which changes into a dark color under the influence of heat, or a substance admixed to the white pigment which itself effects a dark dyeing of the pigment under the influence of heat.

BEST MODE OF PRACTICING THE INVENTION

With specific consideration of the admixture of calcium carbonate, one of the possibilities consists in precipitating the calcium carbonate together with white lead carbonate, which decomposes under the influence of heat into black lead oxides. On the other hand, the calcium carbonate can also be precipitated together with white silver carbonate, which decomposes into black colloidal silver under the influence of heat. Another embodiment of the process as disclosed by the invention consists in that the calcium carbonate is precipitated in an organic aqueous solution so that organic molecules are introduced into the $CaCO_3$ as Ca-salts or alkaline salts. The calcium carbonate can in particular be precipitated together with sodium glycolate. A common characteristic of all these substances mentioned here is that they are normally white or practically colorless so that no wiping tracks whatever are visible. Under the influence of heat, however, these substances change into a dark to black color so that in the writing sections a sufficiently high contrast is achieved. While in one of the processes, i.e., the precipitation of $CaCO_3$ in an organic aqueous solution, organic molecules are introduced into the $CaCO_3$ as Ca-salts or alkaline salts which then carbonize under the influence of heat and effect a dark coloring of $CaCO_3$ crystals, the use of synthetic or natural granulated hard polymers existing as white pigments with a grain size greater than that of all pigments in the lacquer effects a similar process, i.e., the organic components carbonize and thus effect a dark or black coloring. It is of particular advantage in that connection that through respectively selecting the organic component, the carbonization temperature can be fixed down to the respective point. This is of particular importance because immediately following the burnt-out spots, there is no longer a further blackening of the white pigments so that no tracing is visible, either. When the specific case is considered where the calcium carbonate is precipitated together with sodium glycolate, an admixture of approximately 10% sodium glycolate having turned out particularly advantageous, it is evident that immediately following the burnt-out spots there is no further blackening of $CaCO_3$ crystals so that no tracing is visible. It has been found out, however, that this clear black dyeing obtained in this manner changes after extended heat exposure into a brown shade, so that there has obviously been an oxidation of part of the carbon with the oxygen of the air. Consequently, $CaCO_3$ prepared in this manner is sure to remain black in an inert atmosphere with short-time heating. It can thus be generally concluded that with the process as disclosed by the invention, a selective treatment of pigments is effected in such a manner that the pigments contacting the hot electrodes in the burnt-out spots automatically change into a dark or black color, whereas the pigments in the unprinted spots over which the electrodes move in their cold state only retain their white appearance.

What is claimed is:

1. A process for coating a record carrier, said process comprising the steps of:

(1) coating said record carrier with an aluminum-containing layer;

(2) making a mixture of lacquer and a white pigment which changes to a dark color under the influence of heat, and which has a grain size greater than any other pigment in the mixture; and (3) applying a layer of said mixture to said record carrier, with the thickness of the mixture layer such that white pigment particles protrude from the surface.

2. A process as claimed in claim 1 wherein the color change of the white pigment is caused by the addition of another substance to said white pigment.

3. A process as claimed in claim 2 wherein the white pigment is calcium carbonate and the added substance is white lead carbonate.

4. A process as claimed in claim 2 wherein the white pigment is calcium carbonate and the added substance is white silver carbonate.

5. A process as claimed in claim 2 wherein the white pigment is calcium carbonate and the added substance is sodium glycolate.

* * * * *